(No Model.)
H. H. PORTER.
COMBINED VEHICLE BOX AND SPINDLE.
No. 559,146. Patented Apr. 28, 1896.
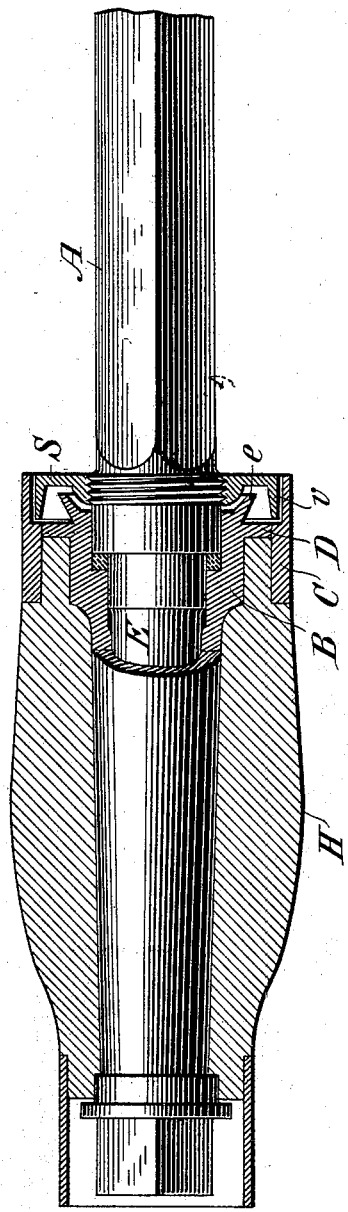
Witnesses
C. E. Ashley
H. W. Lloyd
Inventor
Henry H. Porter
By his Attorney
Charles J. Kintner

UNITED STATES PATENT OFFICE.

HENRY H. PORTER, OF DOWAGIAC, MICHIGAN.

COMBINED VEHICLE BOX AND SPINDLE.

SPECIFICATION forming part of Letters Patent No. 559,146, dated April 28, 1896.

Application filed June 14, 1894. Serial No. 514,550. (No model.)

*To all whom it may concern:*

Be it known that I, HENRY H. PORTER, a citizen of the United States, residing at Dowagiac, in the county of Cass and State of Michigan, have made a new and useful Invention in a Combined Vehicle Box and Spindle, of which the following is a specification.

My invention has for its objects, first, to prevent sand, grit, or dust from penetrating between the spindle and axle-boxes of vehicles; second, to increase or strengthen those portions of the axle-box and hub which lie next to the inner end of the spindle; third, to prevent the creeping of oil from the inner end of the axle-box into the wooden portion of the hub. These objects are accomplished by my invention, which will be fully understood by referring to the accompanying drawing, which is a longitudinal sectional view of the hub of a carriage, part of an axle thereof, together with an axle-box, shown partly in elevational and partly in broken sectional view.

Referring now to the drawing in detail, A represents the carriage-axle and E the spindle thereof, S being a cup-shaped sand-guard secured upon the axle at the inner end of the spindle by screw-threads, or in any preferred manner.

B represents the axle-box, having an enlarged inner end with a cone-shaped extension $e$ and a rim, flange, or extension D resting against the inner end of the wooden hub H, said parts $e$ and D being cast or formed integral with the axle-box B.

C represents the sand-band surrounding the inner end of the hub and fitting snugly against the outer edge of the rim or extension D, the arrangement being such as to prevent the creeping of oil from the spindle into the inner end of the wooden hub.

It will be noticed that the sand-guard S is provided with an internal web or flange $v$, which extends, when the hub is in position, past the cup-shaped extension $e$ on the inner end of the axle-box, the arrangement being such that should any dust, sand, or grit enter between the sand-band and the sand-guard it will immediately find its way to the lower side of the hub and work out.

It will be understood that by reason of the increased thickness of the inner end of the axle-box B, together with the laterally-extending flange D, that portion of the axle-box is materially strengthened, and also that by reason of the tight joint between the rim D and the sand-band C there is no possibility of oil entering the inner end of the wooden hub and thereby gaining access to the socketed ends of the spokes.

I am aware that it is old in the art to attach by screws to the inner end of the wooden portion of a vehicle-hub an internally cup-shaped extension which serves the same function as does the guard or cup-shaped extension $e$ herein shown and described. I am also aware that an axle-box has heretofore been constructed with a cup-shaped extension integral with the box, but having internal bearing upon the flanges or rims secured to the axle, and I make no claim hereinafter broad enough to include such structures.

Having thus described my invention, what I claim, and desire to secure by Letters Patent of the United States, is—

An axle-box B having an integral cup-shaped extension $e$ and an additional rim or flange D resting normally against the inner end of the hub, in combination with a sand-band C secured to the inner end of the hub and forming a tight joint with the rim or flange D, and a cup-shaped sand-guard S secured to the axle and extending inwardly between the sand-band and the cup-shaped extension $e$, all of said parts being arranged substantially as shown and described.

In testimony whereof I have hereunto subscribed my name this 9th day of June, 1894.

HENRY H. PORTER.

Witnesses:
FRED E. LEE,
W. C. PORTER.